(12) United States Patent
Koma et al.

(10) Patent No.: US 8,281,687 B2
(45) Date of Patent: Oct. 9, 2012

(54) ROTATION ANGLE DETECTION DEVICE

(75) Inventors: Tetsuya Koma, Ishikawa (JP); Shozoh Shiraga, Fukui (JP); Hiromitsu Noda, Fukui (JP); Masahide Onishi, Fukui (JP)

(73) Assignee: Panasonic Corporation, Osaka (JP)

( * ) Notice: Subject to any disclaimer, the term of this patent is extended or adjusted under 35 U.S.C. 154(b) by 1127 days.

(21) Appl. No.: 12/169,036

(22) Filed: Jul. 8, 2008

(65) Prior Publication Data
US 2009/0013821 A1 Jan. 15, 2009

(30) Foreign Application Priority Data

Jul. 11, 2007 (JP) ................................. 2007-181928
Mar. 6, 2008 (JP) ................................. 2008-056109

(51) Int. Cl.
*G05G 1/00* (2006.01)

(52) U.S. Cl. ........................................................ 74/575

(58) Field of Classification Search .................... 74/575, 74/552, 813 R; 180/444
See application file for complete search history.

(56) References Cited

U.S. PATENT DOCUMENTS

| | | | | |
|---|---|---|---|---|
| 5,214,982 A | * | 6/1993 | Shieh | ............................... 74/575 |
| 6,546,780 B1 | * | 4/2003 | Palfenier et al. | ............... 73/1.75 |
| 6,834,742 B2 | | 12/2004 | Nakatsu et al. | |
| 6,840,347 B2 | * | 1/2005 | Nakatsu et al. | ................ 180/444 |
| 7,004,281 B2 | * | 2/2006 | Hidaka | ........................... 180/446 |
| 7,465,918 B2 | | 12/2008 | Shimizu et al. | |
| 7,604,089 B2 | * | 10/2009 | Hidaka et al. | ................... 180/446 |
| 7,681,688 B2 | * | 3/2010 | Nakatsu | ......................... 180/444 |
| 2006/0000969 A1 | | 1/2006 | Sano | |

FOREIGN PATENT DOCUMENTS

| | | |
|---|---|---|
| CN | 1485236 | 3/2004 |
| JP | 2-185778 | 7/1990 |
| JP | 2006-17663 | 1/2006 |
| JP | 2006-258625 | 9/2006 |

* cited by examiner

*Primary Examiner* — Vicky Johnson
(74) *Attorney, Agent, or Firm* — Wenderoth, Lind & Ponack, L.L.P.

(57) ABSTRACT

A rotation angle detection device includes rotary body 1 rotating in linked motion with a steering wheel; detectors 2 and 3 that rotate in linked motion with rotary body 1; detecting parts 5 and 6 for detecting rotation of detectors 2 and 3; control part 21 for detecting a rotation angle of rotary body 1 from a detection signal from detecting parts 5 and 6; latching body 23 for latching the rotation of rotary body 1; and case 8 containing rotary body 1, detection parts 5 and 6, control part 21 and latching body 23. Latching body 23 includes latching part 23B urged by elastic body 24 and brought into elastic contact with an outer periphery of rotary body 1; and releasing part 23C for releasing an elastic contact of latching part 23B to rotary body 1 and a part of which is exposed to the outside of case 8.

8 Claims, 11 Drawing Sheets

ROTATION ANGLE DETECTION DEVICE

BACKGROUND OF THE INVENTION

1. Field of the Invention

The present invention relates to a rotation angle detection device used mainly for detecting a rotation angle of a steering wheel of an automobile or the like.

2. Background Art

Recently, functions of an automobile have been enhanced. In such circumstances, automobiles using various rotation angle detection devices so as to detect a rotation angle of a steering wheel and using this detected rotation angle so as to perform various controls of vehicle have been increased. This rotation angle detection device is placed in an automobile in a state in which it is disposed on the rear side of a steering wheel via a rotary connector fixed to a vehicle. The rotary connector and the rotation angle detection device have a through-hole into which a steering shaft of the steering wheel is to be inserted. The rotation angle detection device detects the rotation of the steering shaft rotating in the through-holes.

Such a conventional rotation angle detection device known from, for example, Japanese Patent Unexamined Publication No. 2006-258625 is described with reference to FIG. 11.

Figure 11:
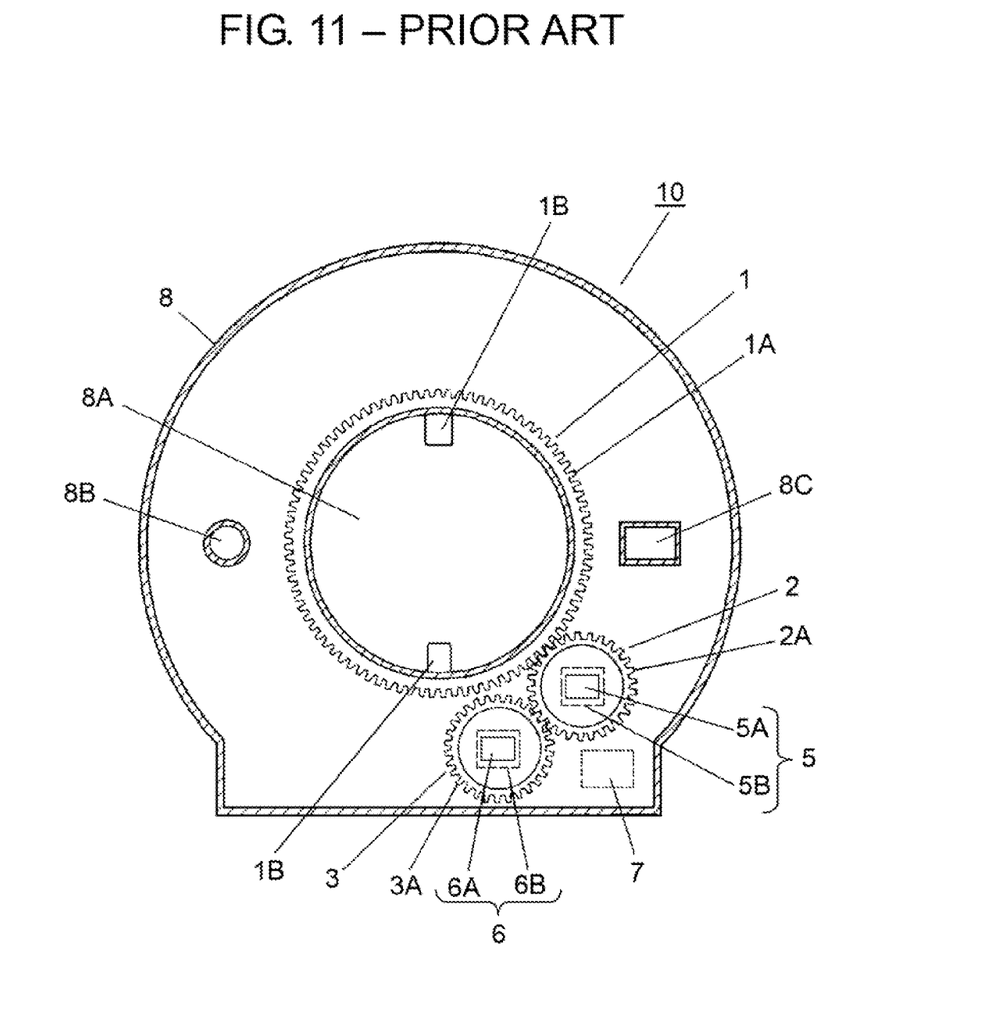
FIG. 11 is a sectional view showing a conventional rotation angle detection device.

FIG. 11 is a sectional view showing a conventional rotation angle detection device. In FIG. 11, rotation angle detection device 10 includes rotary body 1 having spur gear 1A on the outer periphery of the side surface thereof; first detector 2 having spur gear 2A on the outer periphery of the side surface thereof; and second detector 3 having spur gear 3A on the outer periphery of the side surface thereof. Spur gear 1A meshes with spur gear 2A, and spur gear 2A meshes with spur gear 3A. The number of cogs of spur gear 2A is different from that of spur gear 3A. A pair of engaging parts 1B are formed in a protruding way on the inner periphery of the center cylindrical part of rotary body 1.

Magnets 5A and 6A are placed in the center of first detector 2 and the center of second detector 3, respectively. A wiring board (not shown) having a plurality of wiring patterns on the front and rear surfaces thereof is disposed on the front side (a face perpendicular to the drawing) of first detector 2 and second detector 3 in substantially parallel therewith. Magnetic detection elements 5B and 6B are placed on the surface of the wiring board facing magnets 5A and 6A, respectively.

Magnet 5A and magnetic detection element 5B, which face each other, form first detection part 5. Similarly, magnet 6A and magnetic detection element 6B, which face each other, form second detection part 6. The wiring board includes control part 7 having an electronic component such as a microcomputer, which is coupled to magnetic detection elements 5B and 6B.

Rotary body 1, first detector 2 and second detector 3 are rotatably held in case 8 having a substantially box shape and made of insulating resin. In addition, the wiring board is also secured to the inside of case 8. Furthermore, a cover (not shown) made of insulating resin covers the front side of case 8.

Case 8 has through-hole 8A, into which a steering shaft (not shown) is to be inserted, in the center part thereof. Round-shaped attaching hole 8B and rectangular-shaped attaching hole 8C are formed on the left and right portions of case 8 symmetrically with respect to the center of through-hole 8A, that is, the rotation center of rotary body 1.

The rotary connector disposed behind the steering wheel and fixed to a vehicle has a rotary casing latched onto a steering shaft and rotating according to the rotation of the steering shaft. The pair of engaging parts 1B formed on rotation angle detection device 10 are engaged with this rotary casing. The rotary connector has pins to be inserted into attaching holes 8B and 8C formed on case 8. By inserting the pins of the rotary connector into attaching holes 8B and 8C, case 8 is fixed to the rotary connector.

Therefore, when the steering wheel is rotated, the rotary casing is rotated according to the rotation of the steering shaft. According to this, rotary body 1 whose engaging part 1B is engaged with the rotary casing is rotated.

Furthermore, first detector 2 is rotated in linked motion with the rotation of rotary body 1, and second detector 3 is rotated in linked motion with the rotation of first detector 2. Therefore, magnets 5A and 6A placed in the centers of first and second detectors 2 and 3 are also rotated. Magnetic detection elements 5B and 6B detect the change in the magnetic force of magnets 5A and 6A as detection signals, respectively. The output data waveforms of magnetic detection elements 5B and 6B are detection signals differing in the cycle and the phase from each other because the numbers of cogs are different and the rotation speeds are also different between first detector 2 and second detector 3.

Then, control part 7 detects a rotation angle of rotary body 1, that is, a rotation angle of the steering wheel by executing a predetermined operation according to the two different detection signals and the numbers of cogs of first detector 2 and second detector 3. This detected rotation angle is output to an electronic circuit of an automobile, so that various vehicle controls are carried out.

When rotation angle detection device 10 configured as mentioned above is placed in an automobile after it is transported and stored, firstly, as mentioned above, engaging part 1B of rotary body 1 is engaged with the rotary casing of the rotary connector onto which the steering shaft is latched. Furthermore, pins formed on the rotary connector are inserted into attaching holes 8B and 8C of case 8 and placed. However, at this time, while rotation angle detection device 10 is transported, stored, and the like, rotary body 1 may be somewhat rotated. Therefore, it is necessary to carry out a so-called zero point storage with respect to control part 7 of rotation angle detection device 10.

That is to say, a rotation angle of the steering wheel is set to the neutral position of 0°, in other words, as a state in which a vehicle drives straight ahead, and the rotation angle at this time is stored in control part 7 as the neutral position of 0°. Later than this, by detecting the rotation angle of the steering wheel based on this point of zero as a reference, detection of the direction (left or right) of the steering wheel and the rotation angle (degrees) of the steering wheel is carried out.

However, in the above-mentioned conventional rotation angle detection device, when rotation angle detection device 10 is placed in an automobile, it is necessary to carry out the zero point storage with respect to control part 7 in a state in which the steering wheel is set to the neutral position of 0°. That is to say, since the operation for the zero point storage is carried out after rotation angle detection device 10 is placed in an automobile, the fabrication becomes complicated and time-consuming.

SUMMARY OF THE INVENTION

The present invention addresses the problems discussed above, and aims to provide a rotation angle detection device that can be placed in a vehicle easily and can detect a rotation angle reliably.

A rotation angle detection device of the present invention includes a rotary body that rotates in linked motion with a steering wheel; a detector that rotates in linked motion with the rotary body; a detecting part for detecting rotation of the detector; a control part for detecting a rotation angle of the rotary body from a detection signal from the detecting part; a latching body for latching rotation of the rotary body; and a case containing the rotary body, the detection part, the control part, and the latching body. The latching body includes a latching part that is urged by an elastic body and brought into elastic contact with an outer periphery of the rotary body; and a releasing part for releasing an elastic contact of the latching part to the rotary body and a part of which is exposed to the outside of the case.

According to the present invention, the elastic contact of the latching part to the rotary body can be released by the action to the releasing part from the outside. Therefore, zero point storage is carried out with respect to the control part in advance, and the rotation angle detection device can be placed in a vehicle in a state in which the rotation angle is maintained in the neutral position of 0° by the latching body. Therefore, at the time of fabrication of a vehicle, it is not necessary to carry out zero point storage with respect to the control part, and it is possible to detect the rotation angle reliably.

DETAILED DESCRIPTION OF THE INVENTION

Hereinafter, embodiments of the present invention are described with reference to FIGS. 1 to 10. Note here that the same reference numerals are given to parts having the same configuration as those described in the background art, and detailed description thereof is simplified.

First Embodiment

Figure 1:
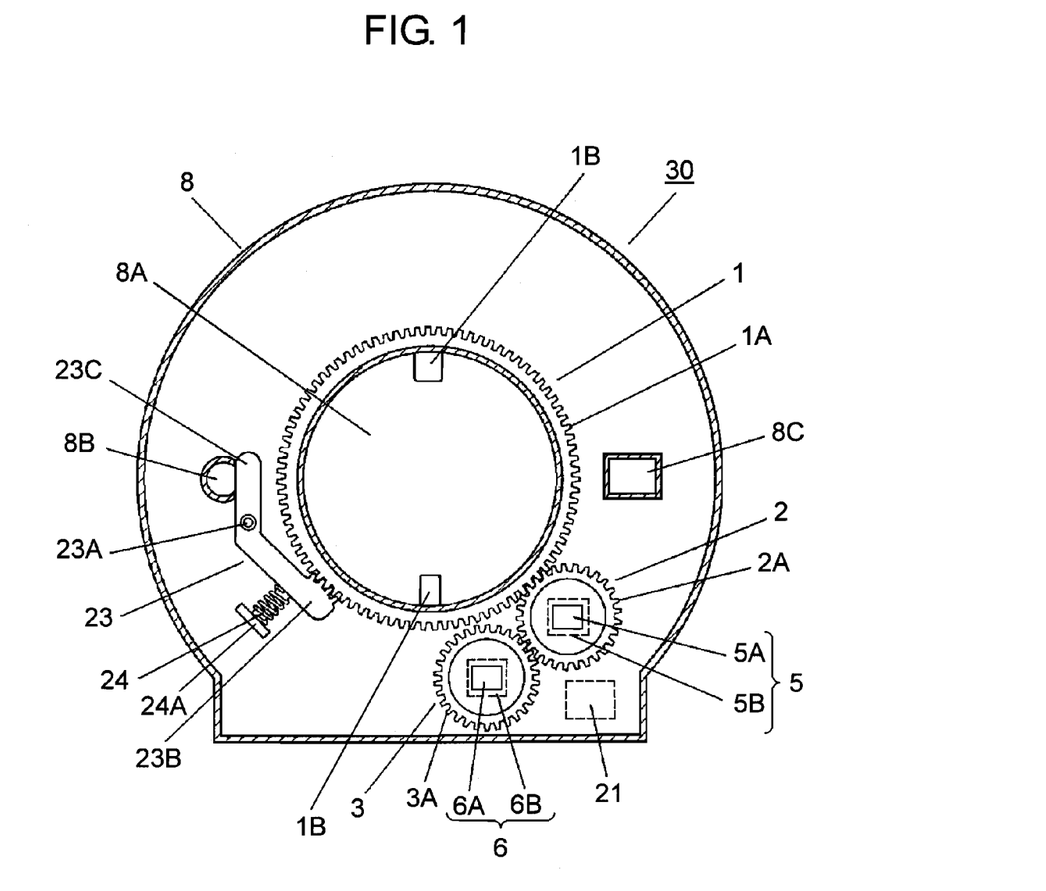
FIG. 1 is a sectional view showing a rotation angle detection device in accordance with a first embodiment of the present invention.
Figure 2:
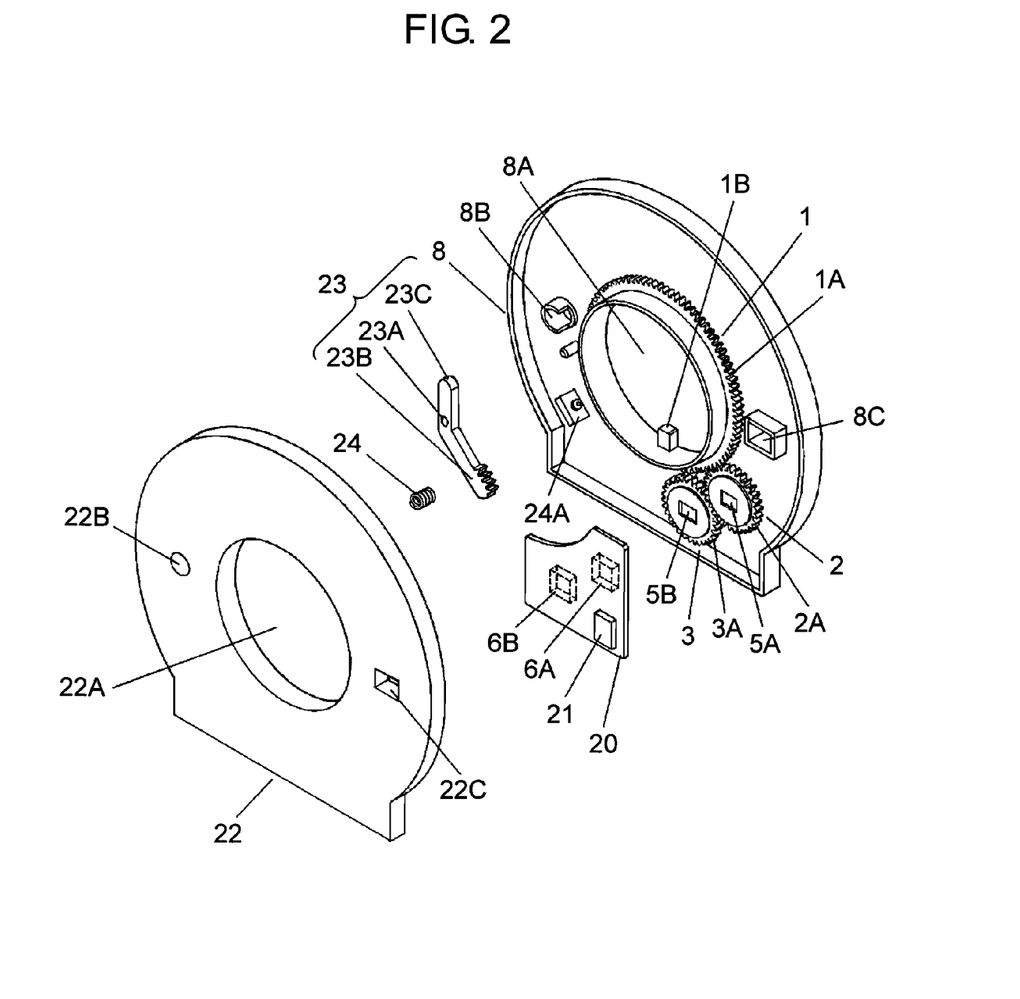
FIG. 2 is an exploded perspective view showing the device.

FIG. 1 a sectional view showing a rotation angle detection device in accordance with a first embodiment of the present invention; and FIG. 2 is an exploded perspective view thereof. In both drawings, rotation angle detection device 30 of the first embodiment includes rotary body 1 made of insulating resin, first detector 2, and second detector 3. Spur gear 1A is formed on the outer periphery of the side surface of rotary body 1; spur gear 2A is formed on the outer periphery of the side surface of first detector 2; and spur gear 3A is formed on the outer periphery of the side surface of second detector 3. The number of cogs of spur gear 2A is different from that of spur gear 3A. Spur gear 2A of first detector 2 meshes with spur gear 1A of rotary body 1; and spur gear 3A of second detector 3 meshes with spur gear 2A of first detector 2. A pair of engaging parts 1B are formed in a protruding way in the inner periphery of the center cylindrical part of rotary body 1.

Rotary body 1 has the largest diameter and the number of cogs among these gears. The diameter and the number of cogs of first detector 2 are smaller than those of second detector 3. For example, the number of cogs of rotary body 1 is 87, that of first detector 2 is 29, and that of second detector 3 is 30.

Magnet 5A is placed in the center of first detector 2 by, for example, insert molding. Furthermore, similarly, magnet 6A is placed in the center of second detector 3. Wiring board 20 is disposed on the front side of first detector 2 and second detector 3 and is substantially parallel therewith. Magnetic detection elements 5B and 6B, for example, an AMR (anisotropic magnetic resistance) element, are placed on a surface facing magnets 5A and 6A, respectively. Furthermore, a plurality of wiring patterns (not shown) are formed on the front and rear surfaces of wiring board 20.

Magnet 5A and magnetic detection element 5B, which face each other, form first detection part 5. Similarly, magnet 6A and magnetic detection element 6B, which face each other, form second detection part 6. Furthermore, wiring board 20 is provided with control part 21 including an electronic component such as a microcomputer. Control part 21 is coupled to magnetic detection elements 5B and 6B via the wiring patterns.

Rotary body 1, first detector 2 and second detector 3 are rotatably held in case 8 having a substantially box shape and made of insulating resin. Wiring board 20 is also fixed and held in case 8. Case 8 is covered with cover 22 made of insulating resin. Case 8 and cover 22 have through-holes 8A and 22A into which a steering shaft (not shown) is inserted in the centers thereof, respectively.

Round-shaped attaching holes 8B and 22B and rectangular-shaped attaching holes 8C and 22C are formed on the left and right portions of case 8 and cover 22 symmetrically with respect to the centers of through-holes 8A and 22A, that is, with respect to the rotation center of rotary body 1.

Furthermore, latching body 23 having substantially a V-shape and made of insulating resin is provided in the vicinity of rotary body 1 in case 8. Latching body 23 is rotatably held in case 8 with supporting point 23A in the middle as a supporting point. Latching body 23 has latching part 23B formed in a shape of a gear in the lower end thereof. Latching body 23 has releasing part 23C, a part of which protrudes to attaching hole 8B of case 8 and is exposed to the outside via attaching hole 8B, at the upper end thereof. Latching part 23B is urged by spring 24 as an elastic body in a somewhat compressed state and is brought into elastic contact with and meshed with spur gear 1A of the periphery of rotary body 1. Spring 24 is made of steel, a copper alloy, and the like, wound in a coil. One end of spring 24 is fixed by fixing piece 24A formed in case 8.

Figure 3:
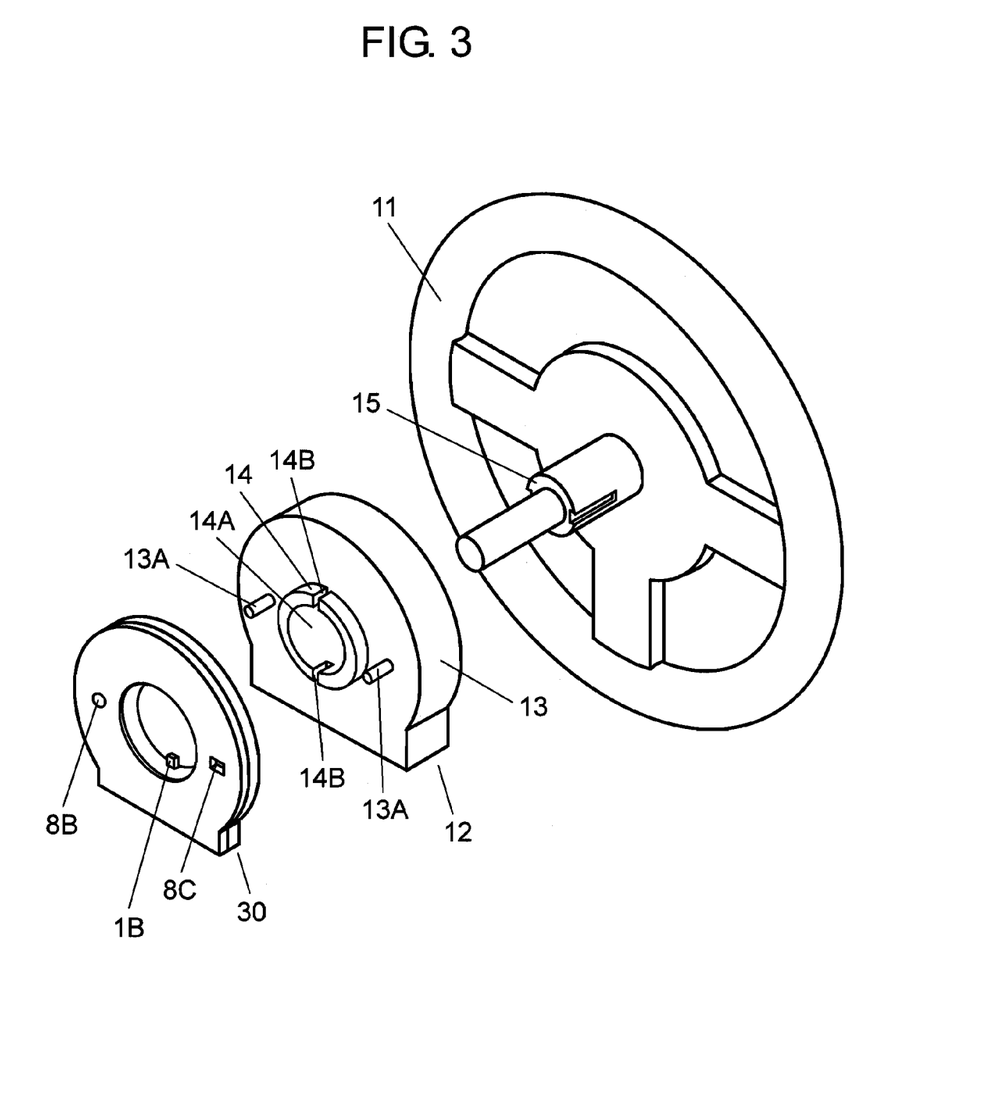
FIG. 3 is an exploded perspective view showing a steering device using the device.

The thus configured rotation angle detection device 30 is disposed on the rear side of steering wheel 11 via rotary connector 12 as shown in the exploded perspective view of FIG. 3, and placed in an automobile. Control part 21 is coupled to an electronic circuit (not shown) of a vehicle via a connector, a lead wire (not shown), or the like.

That is to say, rotary connector 12 has fixed casing 13 as a fixed body secured to a vehicle. Fixed casing 13 includes a winding flexible cable (not shown) inside thereof. Rotary casing 14 is rotatably placed in the center of fixed casing 13. Steering shaft 15 is latched onto the inner periphery of through-hole 14A formed in the center of rotary casing 14. Thus, steering wheel 11 is fixed to fixed casing 13.

Furthermore, rotary casing 14 has a pair of cut-away portions 14B into which a pair of engaging parts 1B of rotary body 1 of rotation angle detection device 30 are fitted. A pair of column-shaped pins 13A as protrusions are formed on fixed casing 13. They are inserted into attaching holes 8B and 8C of case 8 of rotation angle detection device 30. Thus, rotation angle detection device 30 is held by rotary connector 12 secured to a vehicle.

As mentioned above, rotation angle detection device 30 of this embodiment is disposed on the rear side of steering wheel 11 together with rotary connector 12 and placed in an automobile. At this time, the neutral position of 0° as a reference for detecting the rotation angle is already stored, a so-called zero point storage is already carried out in control part 21 of rotation angle detection device 30.

That is to say, rotation angle detection device 30 is manufactured and subjected to an electrical test, a mechanical test, and the like. Then, rotary body 1 is set to the neutral position of 0°. In this state, control part 21 is allowed to store that this position is the zero point. In addition, in this state, latching part 23B of latching body 23 is brought into elastic contact with and meshed with spur gear 1A on the outer periphery of rotary body 1, and held so that this neutral position is not changed. Latching part 23B is brought into elastic contact with and meshed with spur gear 1A. Control part 21 is allowed to store that this position is the zero point. In this state, rotation angle detection device 30 is transported and stored.

Therefore, when rotation angle detection device 30 of this embodiment is placed in a vehicle, it is not necessary to carry out zero point storage with respect to control part 21. Thus, fabrication can be carried out only by placing rotation angle detection device 30 in a state in which the rotation angle of steering wheel 11 is set to the neutral position of 0°, that is, a state in which a vehicle drives straight ahead.

Then, control part 21 of rotation angle detection device 30 is coupled to an electronic circuit (not shown) of a vehicle via a connector, a lead wire (not shown), or the like. Rotary casing 14 is rotatably placed in the center of fixed casing 13 secured to a vehicle of rotary connector 12. Furthermore, steering shaft 15 is latched onto the inner periphery of through-hole 14A of rotary casing 14. In addition, engaging parts 1B of rotary body 1 are fitted in a pair of cut-away portions 14B of rotary casing 14.

Furthermore, columnar shaped pins 13A formed on fixed casing 13 are inserted into attaching holes 8B and 8C of case 8, respectively. Thus, rotation angle detection device 30 is held in rotary connector 12 secured to vehicle. At this time, as shown in a sectional view of FIG. 4, pin 13A inserted into attaching hole 8B presses releasing part 23C of latching body 23 which protrudes and is exposed to attaching hole 8B.

Figure 4:
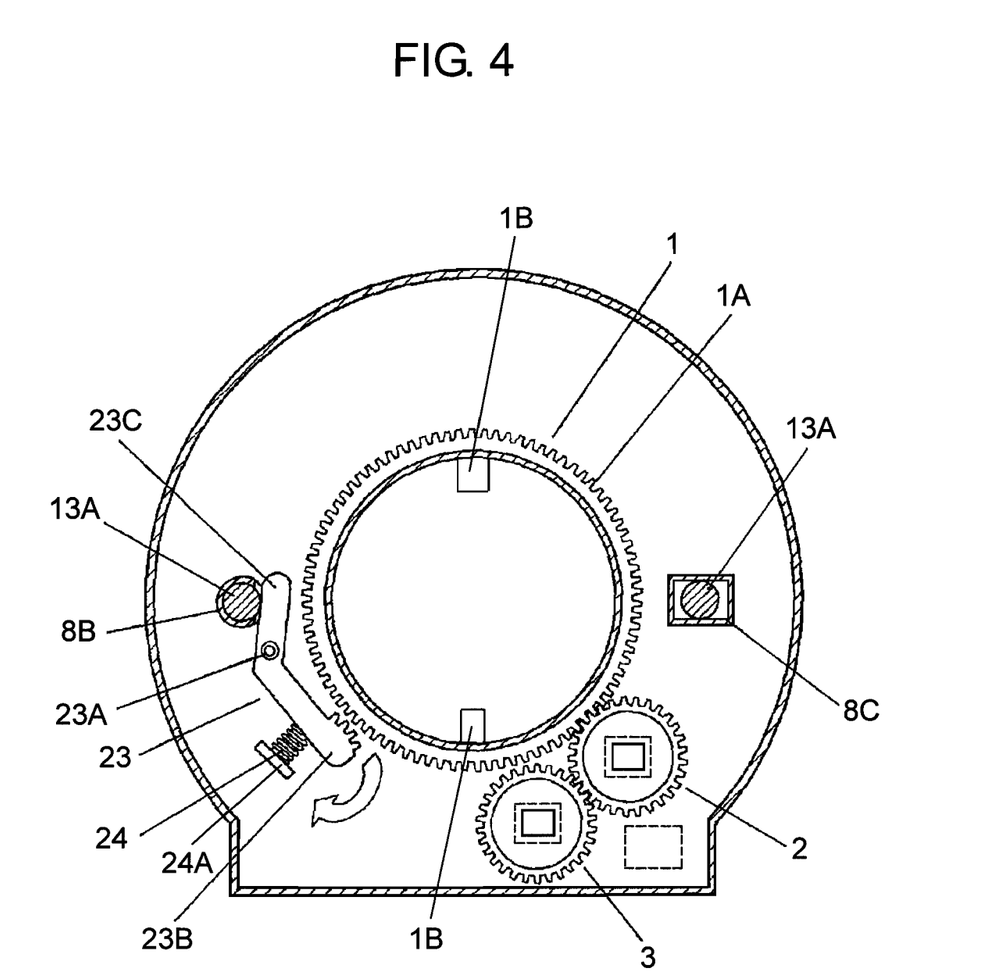
FIG. 4 is a sectional view showing the device when it is placed.

Thus, latching body 23 is rotated in the direction of an arrow around supporting point 23A while compressing spring 24, so that latching part 23B is separated from spur gear 1A on the outer periphery of rotary body 1. Accordingly, rotary body 1 attains a rotatable state.

In the above-mentioned configuration, when steering wheel 11 is rotated, rotary casing 14 latched onto steering shaft 15 is rotated. According to this, rotary body 1 whose engaging part 1B is engaged with cut-away portion 14B is rotated. Thus, rotary body 1 is rotated in linked motion with the rotation of steering wheel 11.

Furthermore, first detector 2 is rotated in linked motion with the rotation of rotary body 1, and second detector 3 is rotated in linked motion with the rotation of first detector 2. Therefore, magnet 5A and magnet 6A placed in the centers of first and second detectors 2 and 3 are also rotated, and the change in the magnetic force of magnets 5A and 6A is detected by magnetic detection elements 5B and 6B as detection signals. The output data waveforms of magnetic detection elements 5B and 6B are detection signals differing in the cycle and the phase from each other because the numbers of cogs are different and the rotation speeds are also different between first detector 2 and second detector 3. That is to say, first detection part 5 and second detection part 6 detect the rotations of first detector 2 and second detector 3, respectively.

Then, control part 21 detects a rotation angle of rotary body 1, that is, a rotation angle of steering wheel 11 by executing a predetermined operation according to the two different detection signals and the numbers of cogs from first detector 2 and second detector 3. This detected rotation angle is output to an electronic circuit of an automobile, so that various controls of a vehicle are carried out.

That is to say, after rotation angle detection device 30 is manufactured, it is transported and stored in a state in which rotary body 1 is maintained at the zero point that is the neutral position by bringing latching part 23B of latching body 23 into elastic contact with and meshed with spur gear 1A. When rotation angle detection device 30 is placed in a vehicle, latching part 23B is separated from spur gear 1A, so that rotary body 1 becomes rotatable. Thus, a rotation angle can be reliably detected with the zero point stored by control part 21 as reference.

That is to say, when rotation angle detection device 30 is manufactured, it can be placed in a vehicle in a state in which the zero point storage is carried out with respect to control part 21 in advance and the rotation angle is maintained to the neutral position of 0° by latching body 23. Therefore, at the time of fabrication of a vehicle, it is not necessary to carry out the zero point storage with respect to control part 21. Thus, rotation angle detection device 30 can be placed in a vehicle easily and the rotation angle can be reliably detected.

Furthermore, when rotation angle detection device 30 is taken out from a vehicle in order to repair an automobile, and the like, rotation angle detection device 30 is taken out from rotary connector 12 in a state in which the rotation angle of steering wheel 11 is set to the neutral position of 0°. Thus, latching body 23 urged by spring 24 is rotated in a direction opposite to the direction when rotation angle detection device 30 is placed as mentioned above, and latching part 23B is brought into elastic contact with and meshed with spur gear 1A of rotary body 1. Furthermore, a part of releasing part 23C protrudes to attaching hole 8B of case 8 and is exposed to the outside. Thus, rotation angle detection device 30 can be taken out in a state of the original neutral position.

Therefore, also when repair or the like is finished and then rotation angle detection device 30 is placed in a vehicle, as mentioned above, when rotation angle detection device 30 is placed in a state in which the rotation angle of steering wheel 11 is set to the neutral position of 0°, that is, a state in which a vehicle drives straight ahead, it is possible to place rotation angle detection device 30 again without the need to carry out zero point storage with respect to control part 21.

Second Embodiment

Figure 5:
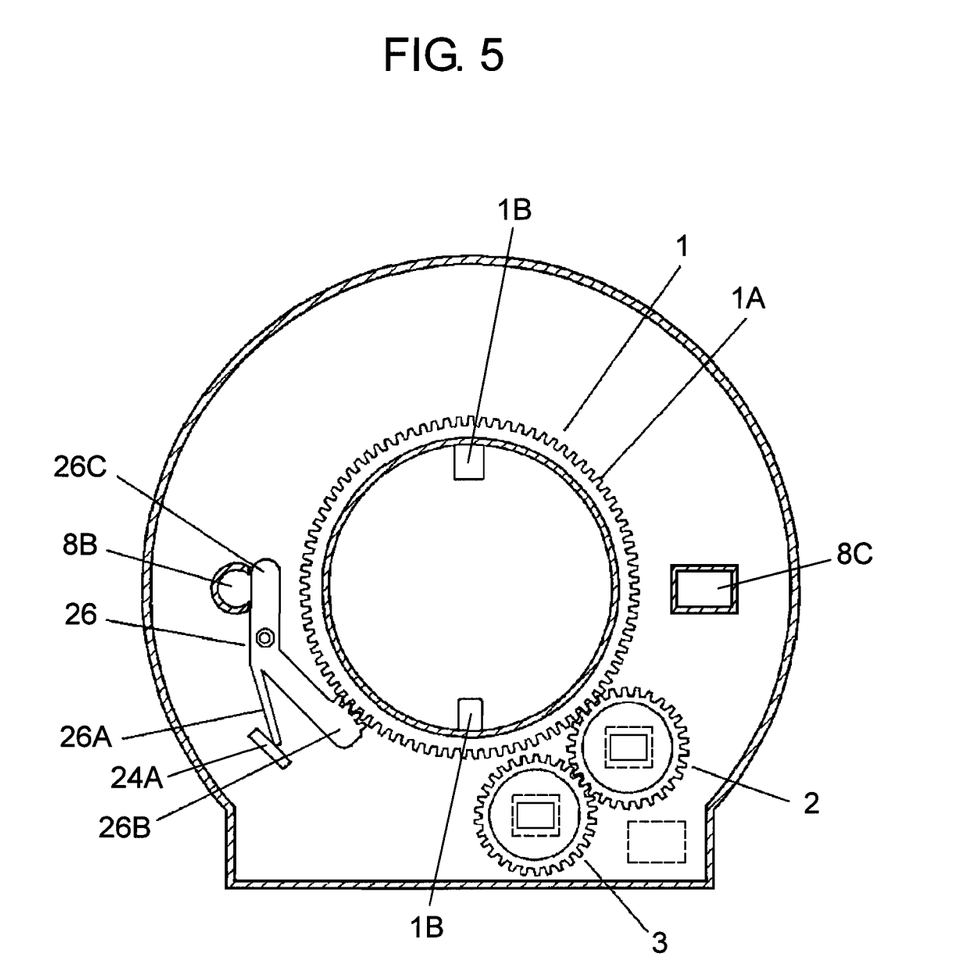
FIG. 5 is a sectional view showing a rotation angle detection device in accordance with a second embodiment of the present invention.

The first embodiment describes a configuration in which spring 24 urges latching body 23. However, in this embodiment, as shown in a sectional view of FIG. 5, thin plate spring 26A as an elastic body is integrated with latching body 26 made of insulating resin, and latching part 26B is brought into elastic contact with and meshed with spur gear 1A of rotary body 1. Furthermore, releasing part 26C is formed in a way in which it protrudes to attaching hole 8B of case 8 and is exposed to the outside. The other configurations are the same as in the first embodiment.

With such a configuration, by the same operation as the first embodiment, the same effect as that of the first embodiment can be achieved. Furthermore, since a separate spring is not needed, the number of components can be reduced, and the rotation angle detection device can be formed at a low cost.

Third Embodiment

The first and second embodiments describe a configuration in which latching bodies 23 and 26 are rotated. However, in this embodiment, as shown in a sectional view of FIG. 6, latching body 27 urged by spring 24 is provided in a way in which it can slide in the direction toward the center. Gear-shaped latching part 27B at the tip of latching body 27 is brought into elastic contact with and meshed with spur gear 1A of rotary body 1. Furthermore, the inner periphery of releasing part 27C is protruded to attaching hole 8B and exposed to the outside. The other configurations are the same as in the first embodiment.

Figure 6:
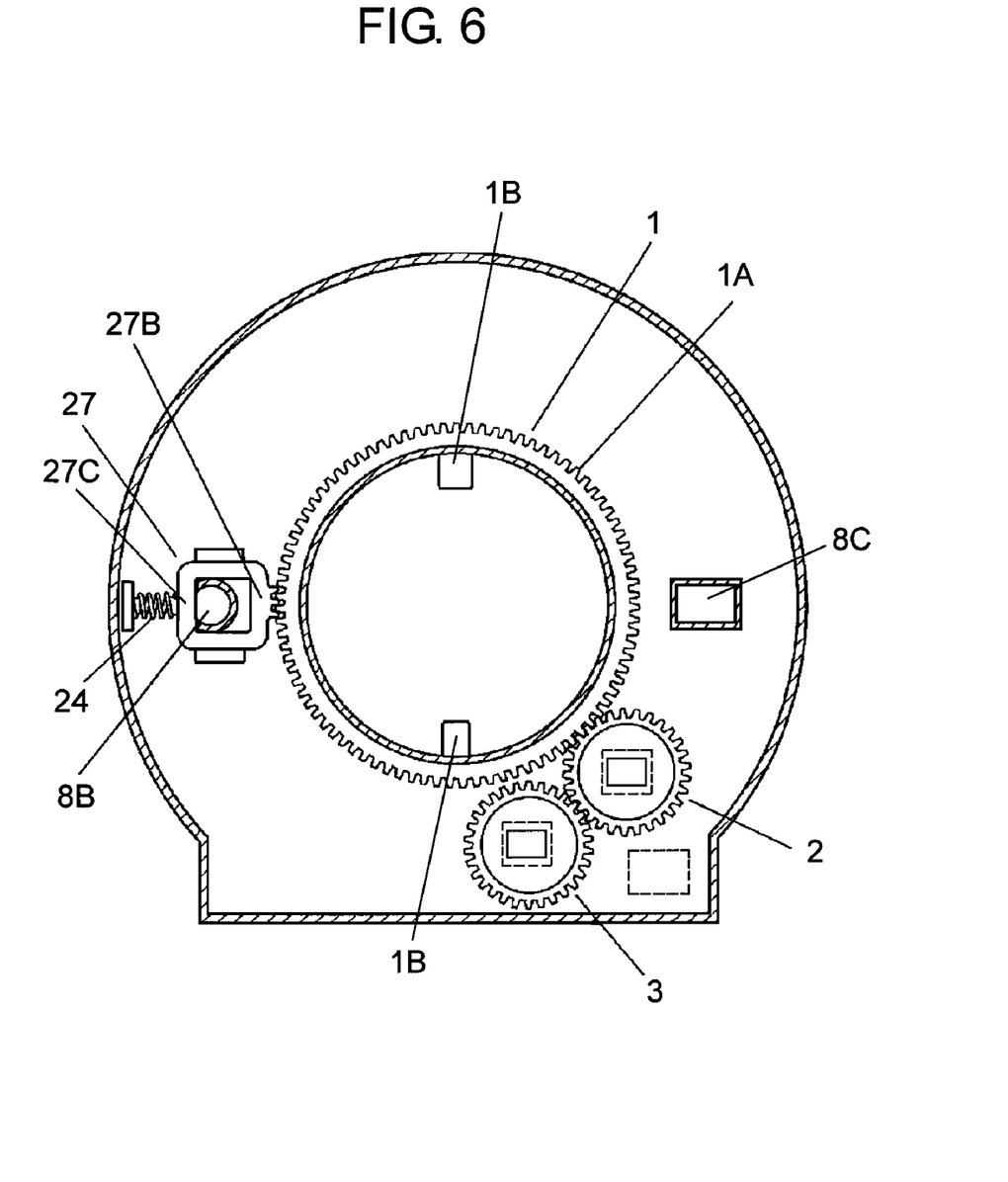
FIG. 6 is a sectional view showing a rotation angle detection device in accordance with a third embodiment of the present invention.

With such a configuration, by the same operation as the first embodiment, the same effect as the first embodiment can be achieved. Furthermore, unlike the first and second embodiments, since latching bodies 23 and 26 are not rotated, the area in which latching body 27 and spring 24 are to be attached can be reduced, which is suitable for high-density of components.

As mentioned above, in accordance with the first to third embodiments, latching parts 23B, 26B and 27B urged by springs 24 and 26A are brought into elastic contact with the outer periphery of rotary body 1, and releasing parts 23C, 26C, and 27C are protruded to attaching hole 8B of case 8 and exposed to the outside. With such a configuration, the zero point storage can be carried out with respect to control part 21 in advance. Furthermore, a rotation angle detection device can be placed in a vehicle in a state in which it is maintained to the neutral position of 0° by latching body 23. Therefore, at the time of fabrication of a vehicle, it is not necessary to carry out the zero point storage with respect to control part 21, and it is possible to obtain a rotation angle detection device that can be placed in a vehicle easily and capable of detecting a rotation angle reliably.

Fourth Embodiment

Note here that the same reference numerals are given to the parts having the same configuration as in the first embodiment, and the detailed description thereof is omitted.

Figure 7:
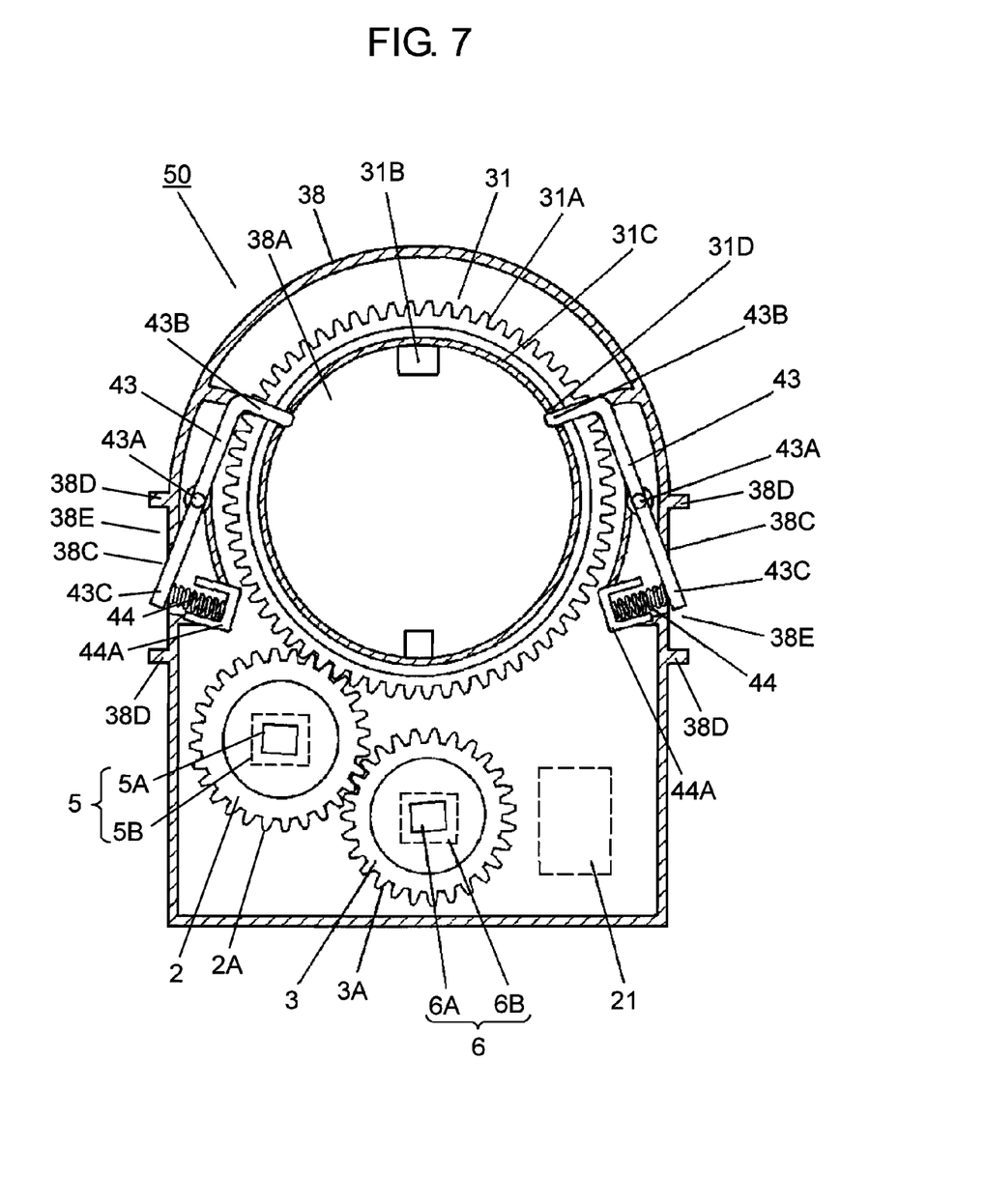
FIG. 7 is a sectional view showing a rotation angle detection device in accordance with a fourth embodiment of the present invention.
Figure 8:
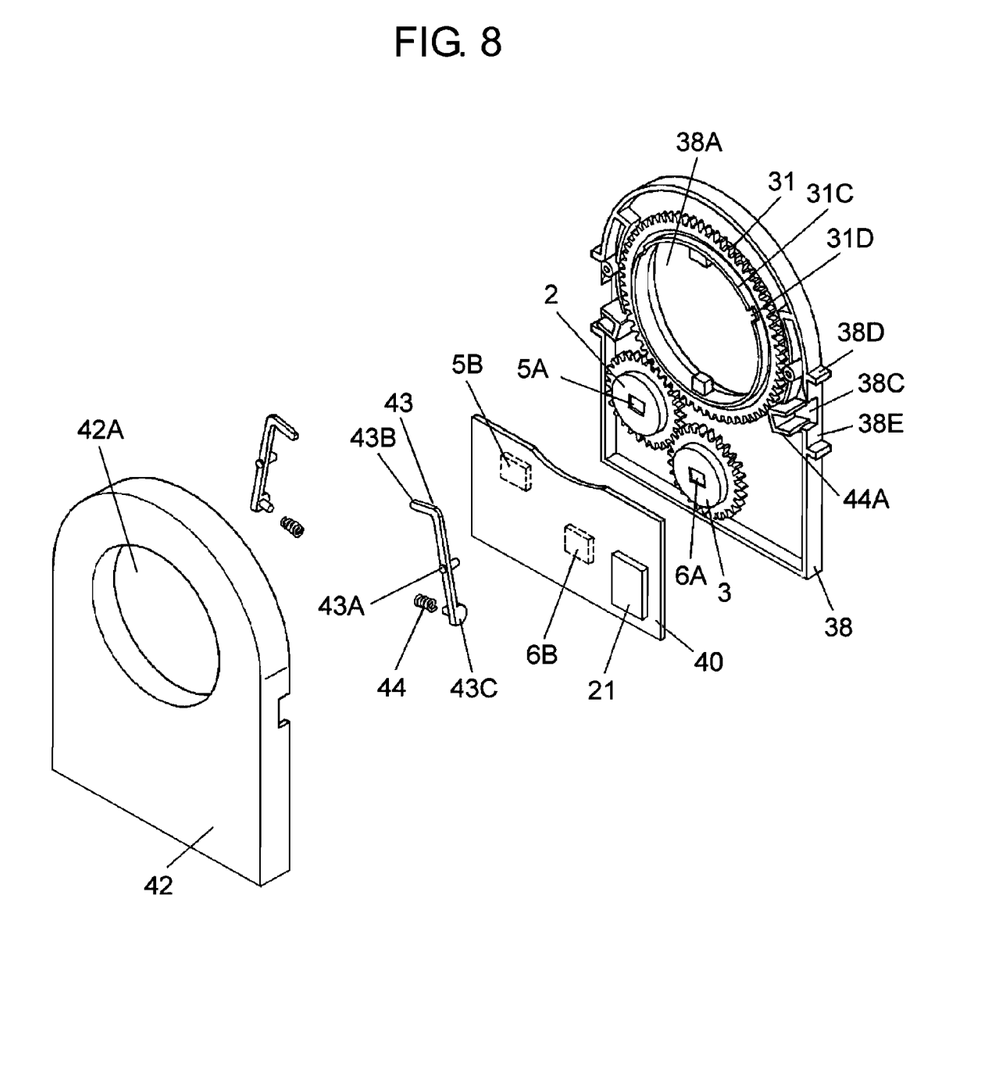
FIG. 8 is an exploded perspective view showing the device.

FIG. 7 is a sectional view showing a rotation angle detection device in accordance with the fourth embodiment; and FIG. 8 is an exploded perspective view thereof. In both drawings, the following configuration is the same as that of the first embodiment. That is to say, spur gear 31A is formed on the outer periphery of the side surface of rotary body 31, and a pair of engaging parts 31B are formed on the inner periphery of the center cylindrical part 31C. Spur gear 2A on the outer periphery of the side surface of first detector 2 meshes with spur gear 31A of rotary body 31. Spur gear 3A on the outer periphery of the side surface of second detector 3 meshes with spur gear 2A of the side surface of first detector 2. First detector 2 and second detector 3 are rotated in linked motion with the rotation of rotary body 31.

Magnet 5A in the center of first detector 2 and magnetic detection element 5B disposed facing magnet 5A form first detection part 5. Magnet 6A of second detector 3 and magnetic detection element 6B facing magnet 6A form second detection part 6. Based on two different detection signals from first detection part 5 and second detection part 6, control part 21 detects a rotation angle of rotary body 31, that is, a rotation angle of a steering wheel (not shown).

Case 38 having a substantially box shape and made of insulating resin is covered with cover 42 made of insulating resin. Rotary body 31, first detector 2, second detector 3, wiring board 40, and the like, are held and contained between case 38 and cover 42. Case 38 and cover 42 have through-holes 38A and 42A, respectively. A steering wheel is inserted into through-holes 38A and 42A. Rotary body 31 is rotated in linked motion with the rotation of the steering wheel.

However, the following configuration is different from the first embodiment. Opening parts 38C are formed on the side surfaces of case 38. Furthermore, in the predetermined positions in the upper and lower directions of left and right opening parts 38C, protrusions 38D protruding outward are formed. Thus, holding parts 38E are formed on the right and left side surfaces of case 38, respectively. Furthermore, cut-away engaging part 31D is provided in cylindrical portion 31C that is an outer periphery of rotary body 31.

Furthermore, on the left and right sides of case 38, substantially L-shaped latching bodies 43 are provided, respectively. Each latching body 43 is supported pivotally in a way capable of rotating around supporting point 43A that is located in substantially the center thereof. Each latching body 43 has latching part 43B protruding inwardly at the upper end thereof. Furthermore, each latching body 43 has releasing part 43C urged by spring 44 that is in a slightly compressed state at the lower end thereof. When releasing part 43C is urged by spring 44, each latching part 43B is rotated around supporting point 43A as a starting point and brought into elastic contact with and engaged with engaging part 31D. Thus, rotary body 31 is maintained in a state of the neutral position of the rotation angle of 0°. Spring 44 is a coil-shaped spring of steel, a copper alloy, or the like. One end of spring 44 is fixed by fixing piece 44A formed on case 38.

Each releasing part 43C at the lower end of each latching body 43 extends to opening part 38C at both sides of case 38, and protrudes in a state in which it is exposed from holding part 38E to the outside. Rotation angle detection device 50 of this embodiment is configured as mentioned above.

Figure 9:
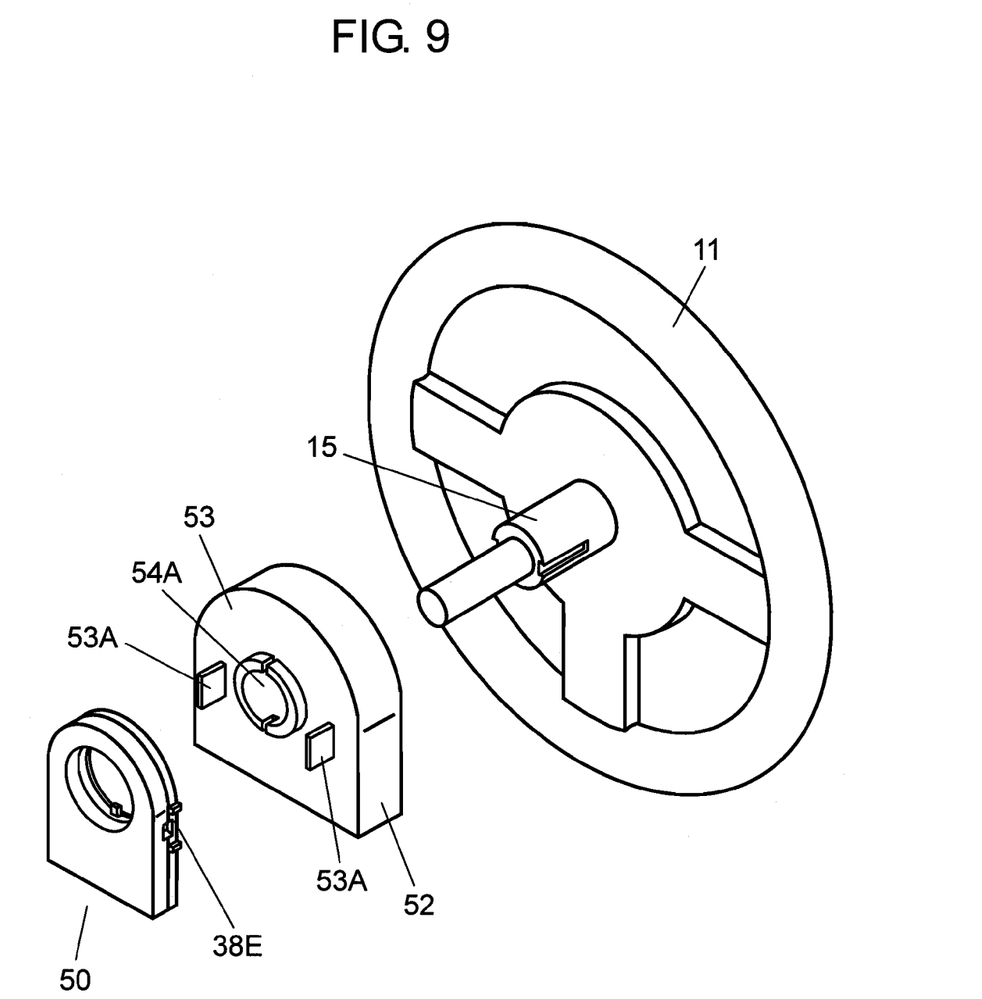
FIG. 9 is an exploded perspective view showing a steering device using the device.

The thus configured rotation angle detection device 50 is disposed together with rotary connector 52 at the rear side of steering wheel 11 as shown in the exploded view of FIG. 9, and placed in an automobile. This configuration is the same as in the first embodiment. However, a configuration in which rotary connector 52 and rotation angle detection device 50 are attached and a method of releasing the holding state of rotation of rotary body 31 by latching body 43 are different from those of the first embodiment as follows.

In the left and right side parts with respect to through-hole 54A at the center of fixed casing 53 of rotary connector 52, ribs 53A as protrusions protruding in the direction of rotation angle detection device 50 and disposed in the positions corresponding to holding parts 38E of rotation angle detection device 50 are provided. When rotation angle detection device 50 is attached to rotary connector 52, each rib 53A is inserted into and engaged with each holding part 38E of rotation angle detection device 50.

Figure 10:
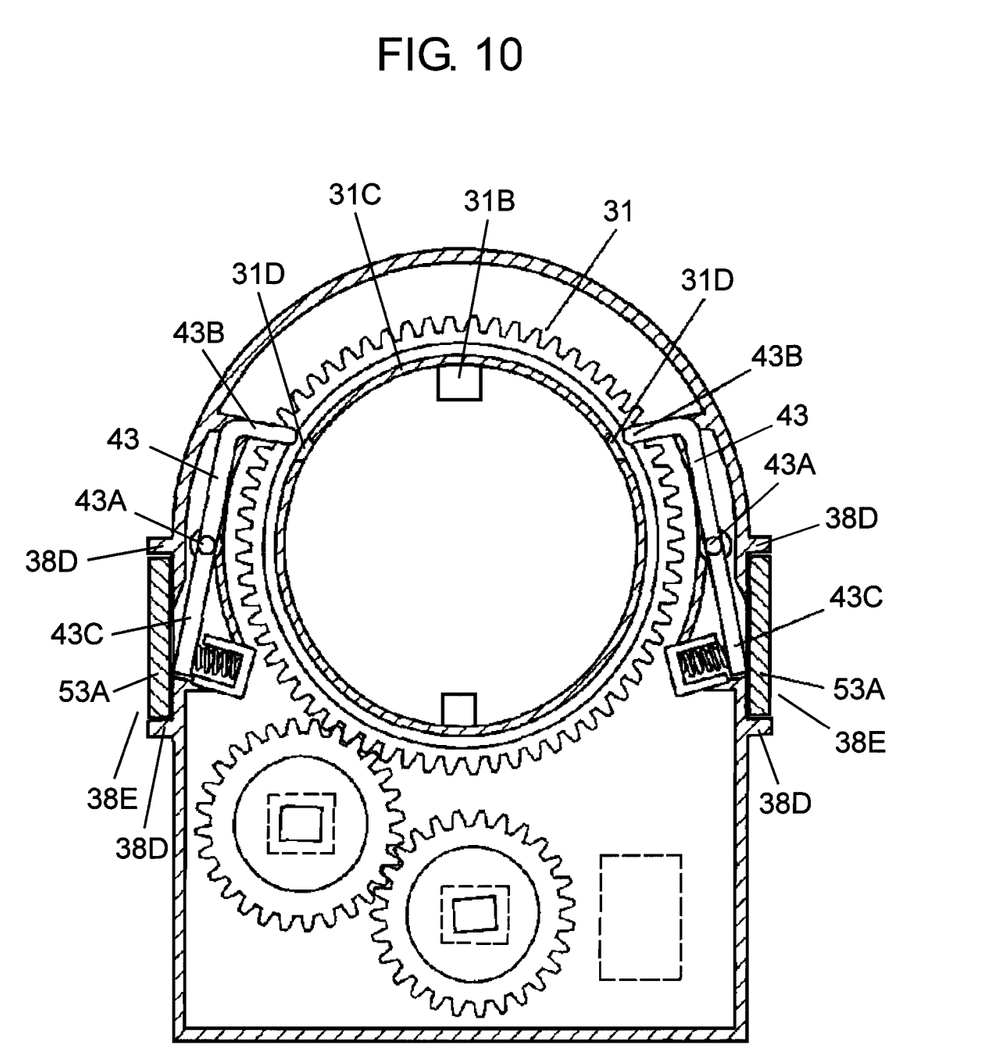
FIG. 10 is a sectional view showing the device when it is placed.

Then, as shown in FIG. 7, when rotation angle detection device 50 is attached to rotary connector 52 in a state in which releasing part 43C of latching body 43 is exposed to the outside and protrudes from holding part 38E of case 38, rib 53A presses releasing part 43C. Thus, as shown in a sectional view of FIG. 10, latching body 43 is rotated around supporting point 43A as a supporting point and moves rotationally in the inward direction. As a result, latching part 43B that is brought into elastic contact with engaging part 31D of cylindrical part 31C is separated from latching part 31D, and thus rotary body 31 is in a rotatable state.

That is to say, after rotation angle detection device 50 is manufactured, latching part 43B of latching body 43 is brought into elastic contact with engaging part 31D on the outer periphery of cylindrical part 31C of rotary body 31. Thereby, rotation angle detection device 50 is transported and stored in a state in which rotary body 31 is maintained at the zero point, that is, in the neutral position. Thereafter, when rotation angle detection device 50 is placed in a vehicle, each rib 53A presses releasing part 43C, and then latching part 43B is separated from engaging part 31D, so that rotary body 31 becomes rotatable. Therefore, when rotation angle detection device 50 is placed in a vehicle, the rotation angle can be detected reliably based on the zero point that is already stored by control part 21 as the reference.

That is to say, with the above-mentioned configuration in which rotation angle detection device 50 is attached to rotary connector 52 in the different way from that of the first embodiment, the following effect can be also achieved as in the first embodiment. When rotation angle detection device 50 is manufactured, the zero point storage is carried out with respect to control part 21 in advance and rotation angle detection device 50 can be placed in a vehicle in a state in which the neutral position of the rotation angle is maintained at 0° by latching body 43. Therefore, at the time of fabrication of a vehicle, it is not necessary to carry out the zero point storage with respect to control part 21, and rotation angle detection device 50 can be placed in a vehicle easily and the rotation angle can be detected reliably.

In this way, according to this embodiment, latching body 43 is provided in case 38 containing rotary body 31, control part 21, and the like; latching part 43B urged by spring 44 is brought into elastic contact with the outer periphery of cylindrical part 31C of rotary body 31; and releasing part 43C is protruded to the outside of case 38. Thus, the zero point storage is carried out with respect to control part 21 in advance and, rotation angle detection device 50 can be placed in a vehicle in a state in which the rotation angle is maintained in the neutral position of 0° by latching body 43. Therefore, at the time of fabrication of a vehicle, it is not necessary to carry out the zero point storage with respect to control part 21. Thus, it is possible to obtain a rotation angle detection device that can be placed in a vehicle easily and detect a rotation angle reliably.

Note here that the above-mentioned fourth embodiment describes a configuration in which rotation of rotary body 31 is held by two latching bodies 43 from the left and right sides of case 38. However, the same effect can be achieved by the configuration in which latching body 43 is provided in only one of the left side or the right side.

Furthermore, the above-mentioned fourth embodiment describes a configuration in which latching body 43 is urged by spring 44. Similar to the case of the second embodiment, a thin plate spring part can be integrated with latching body 43 made of insulating resin. With this spring part, latching part 43B may be brought into elastic contact with engaging part 31D.

Furthermore, the above-mentioned embodiments describe a configuration in which rotary bodies 1 and 31 and gears of the detectors are meshed with each other and they are rotated in linked motion with each other. However, besides gears, for example, convex and concave portions or high friction portions, which can transmit the rotation, may be formed on the outer periphery of the rotary body and the detector, so that they are rotated in linked motion with each other. Thereby, the same effect can be obtained.

What is claimed is:

1. A rotation angle detection device, comprising:
    a rotary body arranged to rotate about a rotation axis in linked motion with a steering wheel that is rotatably mounted to a fixed body;
    a detector that rotates in linked motion with the rotary body;
    a detecting part for detecting rotation of the detector and generating a detection signal;
    a control part arranged to receive the detection signal from the detecting part for detecting a rotation angle of the rotary body from the detection signal;
    a latching body for latching with the rotary body to prevent rotation of the rotary body; and
    a case containing the rotary body, the detection part, the control part, and the latching body; wherein the latching body includes a latching part that is movable between a release position, in which the latching part allows the rotary body to rotate, and a latching position in which the latching body is in contact with the rotary body to latch with the rotary body and prevent rotation of the rotary body;
    wherein an elastic body elastically urges the latching part toward the latching position; and
    wherein the latching body further includes a releasing part for moving the latching part to the release position against the urging of the elastic body, said releasing part being exposed so as to be mechanically engaged by the fixed body from outside the case.

2. The rotation angle detection device of claim 1, wherein the releasing part releases the contact of the latching part to the rotary body with a part of the latching body as a supporting point.

3. The rotation angle detection device of claim 1, wherein the latching part is brought into the contact with the outer periphery of the rotary body in a neutral position as a reference for detecting the rotation angle of the rotary body, and the neutral position is stored in the control part.

4. The rotation angle detection device of claim 1, wherein a gear portion is provided on the outer periphery of the rotary body, and the latching part is brought into the contact with the rotary body by contacting the gear portion.

5. The rotation angle detection device of claim 1, wherein a cylindrical portion is provided on the outer periphery of the rotary body, and the latching part is brought into the contact with the rotary body by contacting an engaging part of the cylindrical portion.

6. The rotation angle detection device of claim 4, wherein the releasing part is exposed to an attaching hole provided in the case and into which a protrusion is inserted, and the protrusion is provided on the fixed body.

7. The rotation angle detection device of claim 5, wherein the releasing part is exposed to a holding part provided on the case and held by a protrusion on the fixed body.

8. The rotation angle detection device of claim 1, wherein the latching body is integrated with the elastic body.

* * * * *